Patented Apr. 18, 1933

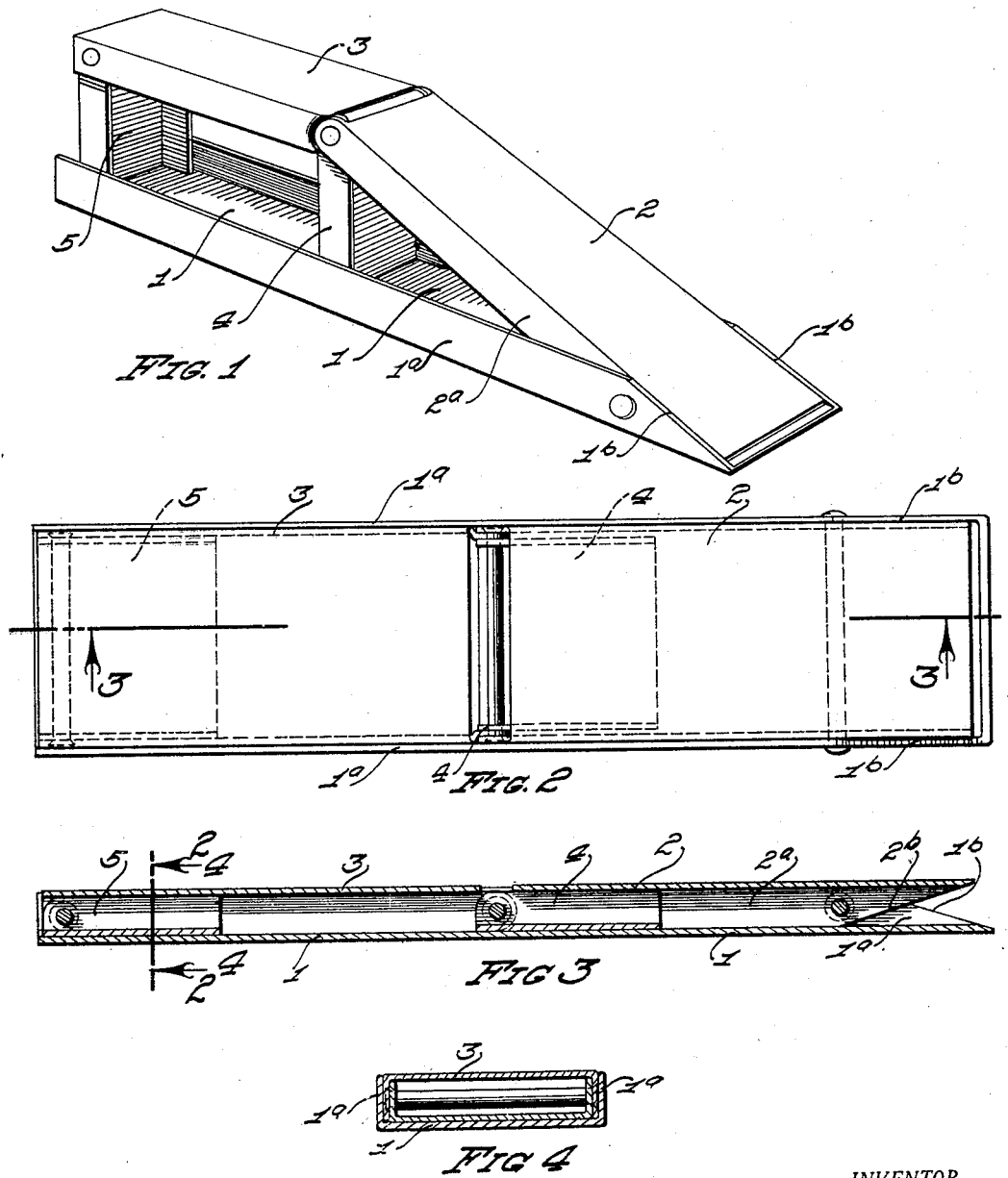

1,904,693

UNITED STATES PATENT OFFICE

LA FAYETTE MYERS AND CLARENCE S. PRESTON, OF SAN DIEGO, CALIFORNIA

VEHICLE LIFTING DEVICE

Application filed August 10, 1928. Serial No. 298,676.

Our invention relates to vehicle lifting devices and the objects of our invention are: First, to provide a device of this class which eliminates the need of an automobile jack as the car wheel is raised to its desired position by merely driving the vehicle upon the lifting device; second, to provide a device of this class which occupies a minimum amount of space when collapsed; third, to provide a device of this class in which the various portions telescope within each other when collapsed; fourth, to provide a device of this class which is extremely sturdy of construction and capable of standing much hard use and abuse; and fifth, to provide a device of this class which is simple and economical of construction, durable, efficient in its action and which will not readily deteriorate or get out of order.

With these and other objects in view as will appear hereinafter, our invention consists of certain novel features of construction, combination and arrangement of parts and portions as will be hereinafter described in detail and particularly set forth in the appended claims, reference being had to the accompanying drawing and to the characters of reference thereon which form a part of this application in which:

Figure 1 is a perspective view of our vehicle lifting device; Fig. 2 is a top or plan view thereof; Fig. 3 is a sectional view thereof through 3—3 of Fig. 2 and Fig. 4 is an end elevational view from the line 4—4 of Fig. 3.

Similar characters of reference refer to similar parts and portions throughout the several views of the drawing.

Base member 1, incline member 2, vehicle support 3, prop members 4 and 5, constitute the principal parts and portions of our vehicle lifting device.

The base member 1 is formed of channel iron of suitable length and width and when in use lies with its flat or base portion downwardly and the side walls 1a extending upwardly, as shown in Fig. 1. The side walls 1a are provided with oppositely disposed beveled portions 1b at one of their ends. Pivotally secured near the beginning of the beveled portions 1b is an incline member 2 which is also made of channel iron and which is adapted to telescope within the base member 1. The side walls 2a of the incline member 2 are also provided with oppositely disposed beveled portions 2b at one of their ends so as to permit one end of the incline member 2 to engage the base portion of the base member 1 and form a relatively sharp beginning for the incline over which the wheel of a vehicle may easily pass. The other end of the incline member 2 is hinged to a vehicle support member 3 which is similar to the incline member except that when extended it is in a horizontal position. The vehicle support member 3 is also made of channel iron and adapted to telescope within the base member 1.

Also secured at the place where the incline member 2 and vehicle support member 3 are secured together is a prop member 4, the extended end of which is adapted to rest against the base portion of the base member and hold the forward end of the vehicle support member in spaced relation to said base member, as shown in Fig. 1 of the drawing. The other end of the vehicle support member is also held in elevated position by means of a second prop member 5 which is hinged thereto.

As shown in the drawing the incline member 2 and vehicle support member 3 telescope between the side walls of the base member 1 and the prop members 4 and 5 telescope between the walls of the incline member 2 and vehicle support member 3 respectively.

When desiring to use our vehicle lifting device the vehicle support member 3 is raised and the prop members 4 and 5 are pushed into a vertical position. The vehicle is then driven up the incline member 2 until the wheels thereof rest upon the vehicle support member 3. A block is then placed under the vehicle axle or other suitable place and the prop members are knocked down causing the vehicle lifting device to collapse.

It is obvious from the construction as illustrated in the drawing and described in the foregoing specification that there is provided a vehicle lifting device as aimed at and set forth in the objects of the invention and though we have shown and described a particular construction, combination and arrangement of parts and portions, we do not wish to be limited to this particular construction, combination and arrangement but desire to include in the scope of our invention the construction, combination and arrangement substantially as set forth in the appended claims.

Having thus described our invention, what we claim as new and desire to secure by Letters Patent is:

1. In a vehicle lifting device, a base member, an incline member pivotally secured near one of its ends to said base member, a vehicle support member hinged to the other end of said incline member and collapsible props for supporting the ends of said vehicle support member without subjecting said inclined member to strain, said incline member and vehicle support member adapted to telescope within said base member.

2. In a vehicle lifting device, a channel shaped base member, a channel shaped incline member pivoted near one of its ends to said base member and adapted to telescope therewith, a channel shaped vehicle support member hinged to the other end of said incline member and adapted to telescope with said base member, and channel-shaped props for supporting the ends of said vehicle support member, the side portions of said props being hinged at their upper ends to the side portions of said support member, their ends forming U-shaped bases for ensuring stability, said collapsible props adapted to telescope with said base member, incline member and vehicle support member.

In testimony whereof, we have hereunto set our hands at San Diego, California, this 3d day of August, 1928.

LA FAYETTE MYERS.
CLARENCE S. PRESTON.